(12) United States Patent
Vincan et al.

(10) Patent No.: US 12,221,558 B2
(45) Date of Patent: Feb. 11, 2025

(54) METHOD FOR CREATING AN ADHESIVE BOND USING AN ELASTOMERIC MATERIAL

(71) Applicant: MIS.CARBONART PTY LTD, Applecross (AU)

(72) Inventors: Alexander Vincan, Mosman Park (AU); Yue Sun, Thornlie (AU); Gary Charles Strickland, Kalamunda (AU)

(73) Assignee: MIS.CARBONART PTY LTD, Applecross (AU)

( * ) Notice: Subject to any disclaimer, the term of this patent is extended or adjusted under 35 U.S.C. 154(b) by 340 days.

(21) Appl. No.: 17/641,104

(22) PCT Filed: Jul. 24, 2020

(86) PCT No.: PCT/AU2020/050755
§ 371 (c)(1),
(2) Date: Mar. 8, 2022

(87) PCT Pub. No.: WO2021/012010
PCT Pub. Date: Jan. 28, 2021

(65) Prior Publication Data
US 2023/0332022 A1    Oct. 19, 2023

(30) Foreign Application Priority Data
Jul. 24, 2019 (AU) ................ 2019902624

(51) Int. Cl.
| C09J 115/00 | (2006.01) |
| B32B 15/18 | (2006.01) |
| B32B 15/20 | (2006.01) |
| B32B 17/00 | (2006.01) |
| B32B 25/00 | (2006.01) |

(52) U.S. Cl.
CPC ............ *C09J 115/00* (2013.01); *B32B 15/18* (2013.01); *B32B 15/20* (2013.01); *B32B 17/00* (2013.01); *B32B 25/00* (2013.01); *B32B 2262/106* (2013.01); *C09J 2301/312* (2020.08); *C09J 2400/143* (2013.01); *C09J 2400/163* (2013.01);
(Continued)

(58) Field of Classification Search
None
See application file for complete search history.

(56) References Cited

FOREIGN PATENT DOCUMENTS

EP  0368274 A2 *  5/1990

OTHER PUBLICATIONS

Machine translation (Year: 2024).*

* cited by examiner

*Primary Examiner* — Alexander S Thomas
(74) *Attorney, Agent, or Firm* — Haynes and Boone, LLP

(57) ABSTRACT

Embodiments herein provides a system for creating an adhesive bond using elastomeric material. The system includes the steps of (i) a first material, the first material having a first material length and a first material width, (ii) a second material, the second material having a second material length and a second material width, (iii) a gap between the first material and the second material, (iv) an elastomeric material substantially filling at least a portion of the height and length of the gap between the first material and the second material. The gap includes a height and a length. The height being substantially equal to a distance between the first material and the second material and the length being substantially orthogonal to the height and defined by a degree of overlap between the first and second materials.

25 Claims, 8 Drawing Sheets

(52) U.S. Cl.
CPC ........ *Y10T 428/192* (2015.01); *Y10T 428/197* (2015.01)

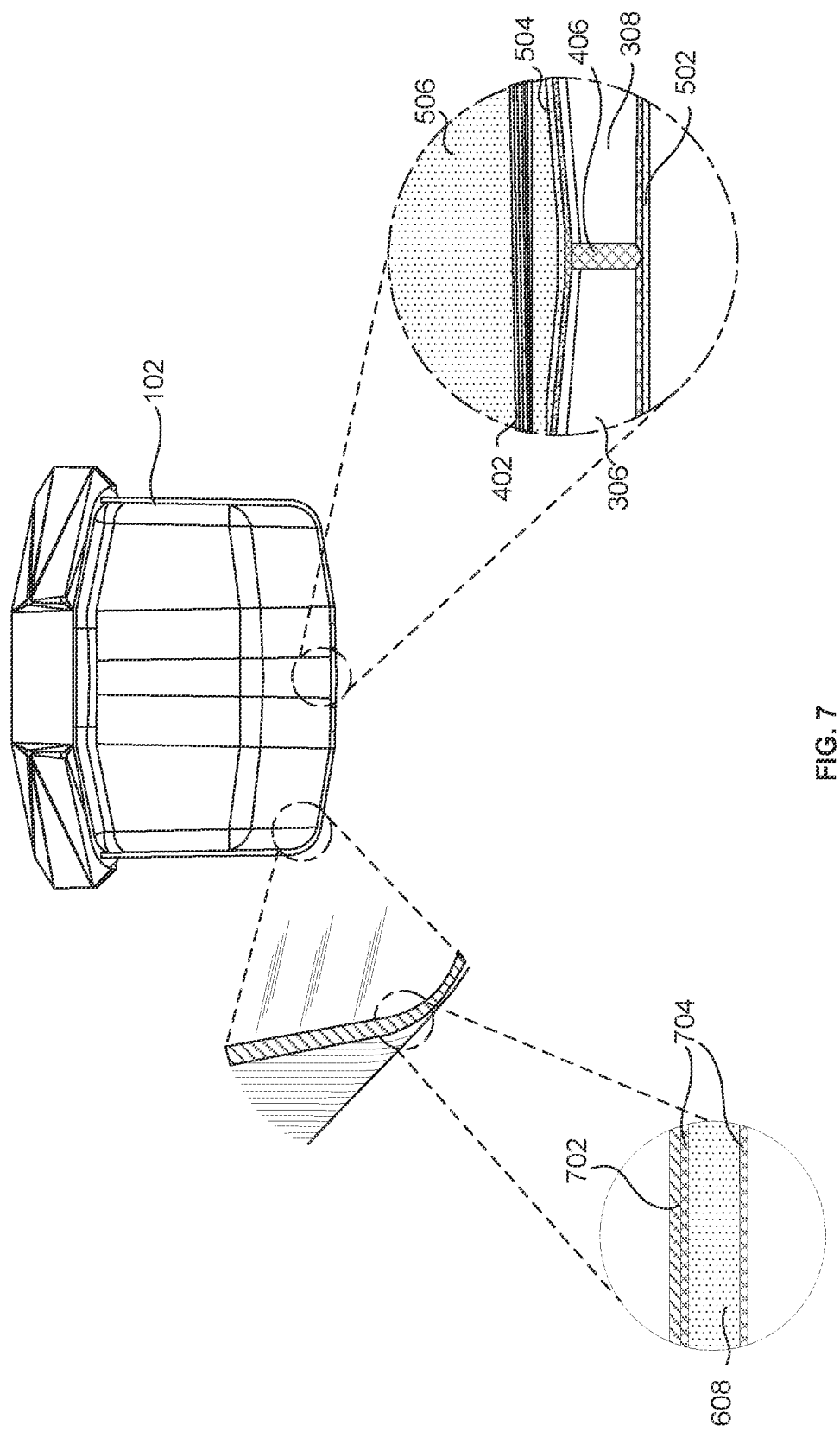

METHOD FOR CREATING AN ADHESIVE BOND USING AN ELASTOMERIC MATERIAL

PRIORITY CLAIM AND CROSS-REFERENCE TO RELATED APPLICATIONS

This application is a National Phase of PCT/AU2020/050755 filed Jul. 24, 2020, which claims benefit of and priority to Australia Provisional Patent Application AUSN 2019902624 filed Jul. 24, 2019, titled METHOD FOR CREATING AN ADHESIVE BOND USING AN ELASTOMERIC MATERIAL, and is hereby incorporated by reference in its entirety, to the extent it is not inconsistent herewith.

This application incorporates by reference in its entirety, to the extent it is not inconsistent herewith, Australia Provisional Patent Application AUSN 2019902623 filed Jul. 24, 2019, titled LIGHTWEIGHT TRAY WITH PNEUMATIC CUSHIONING SYSTEM, Australia Provisional Patent Application AUSN 2019902625 filed Jul. 24, 2019, tided ENERGY-DISSIPATIVE PNEUMATIC CUSHIONING SYSTEM, and Australia Provisional Patent Application AUSN 2019902628 filed Jul. 24, 2019, titled METHOD FOR APPLYING A PROTECTIVE COATING TO A HAUL TRUCK TRAY.

TECHNICAL FIELD

Embodiments herein are related to haul truck tray fabrication, and more particularly to methods for bonding one or more composite and/or metal materials using an elastomeric material.

BACKGROUND

The inventors of the inventions disclosed and claimed herein have recognized novel technical problems relating to haul truck component design, and have promulgated novel technical solutions to those problems, including improved haul truck tray design and manufacturing methods, improved tray support infrastructure, and improved cushioning elements to better support a tray. These improvements provide many benefits, including reduced overall truck weight, increased vehicle fuel efficiency, improved load capacity, reduced wear and tear, and better operational safety.

SUMMARY

In view of the foregoing, an embodiment herein provides a system for creating an adhesive bond using an elastomeric material. The system includes (i) a first material, the first material having a first material length and a first material width; (ii) a second material, the second material having a second material length and a second material width; (iii) a gap between the first material and the second material, and (iv) an elastomeric material substantially filling at least a portion of the height and length of the gap between the first material and the second material. The gap includes a height and a length. The height being substantially equal to a distance between the first material and the second material and the length being substantially orthogonal to the height and defined by a degree of overlap between the first and second materials.

The embodiments herein enhance shear strength, tensile strength, and flex for energy absorption of a haul truck dump tray, providing strong bonding of the first material and the second material such that the joined materials will function as single unit and stay together through repeated high impact shocks for the life of the tray. This in turn results in more efficient and safe operation of the haul truck and tray.

In some embodiments, the first material and the second material are dissimilar materials. In some embodiments, the first material and the second material are substantially the same materials. In some embodiments, at least one of the first material or the second material comprises at least one of a composite material, a metal, a ceramic, or a polymer. In some embodiments, the first material is a carbon fiber composite material. In some embodiments, the first material is a steel material. In some embodiments, the first material is an aluminum alloy material. In some embodiments, the first material is a fiberglass material.

In some embodiments, the height of the gap is 1 mm or greater. In some embodiments, the height of the gap is 2 mm or greater. In some embodiments, the height of the gap is 3 mm or greater. In some embodiments, the height of the gap is at least 3 mm and no greater than 12 mm. In some embodiments, the elastomeric material has a maximum shear strength of about 5 MPa. In some embodiments, the elastomeric material has a maximum shear strength of about 8 MPa. In some embodiments, the elastomeric material has a tensile strength greater than or equal to 0.2 MPa. In some embodiments, the elastomeric material has a Young's Modulus equal to or less than 35 MPa at 300% elongation. In some embodiments, the elastomeric material has an elongation break of not less than 300%. In some embodiments, the elastomeric material has an elongation break of greater than 20%. In some embodiments, the elastomeric material has an elongation break of greater than 50% at +23 degrees Celsius. In some embodiments, the elastomeric material comprises a polyurethane material. In some embodiments, the elastomeric material comprises as a cast polyurethane material. In some embodiments, the first material further comprises an upward bend of +/−5° on each side of the center line from a 180° angle representing a horizontal plane on the bottom of the tray. In some embodiments, the first material further comprises a bend of up to +/−30° on each side of the center line from a 180° angle representing a horizontal plane on the bottom of the tray. In some embodiments, the first material and second material are substantially coterminous as to their respective lengths. In some embodiments, the first material and second material are substantially coterminous as to their respective widths.

In some embodiments, the system comprises a coating system. The coating system is designed to cover at least a portion of a combination of least two of: the first material length, the first material width, the second material length and the second material width.

In some embodiments, the coating system comprises a wear liner. In some embodiments, the coating system comprises a cast polyurethane wear liner.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 7 illustrates an example cross-sectional view depicting an adhesive bond the haul truck tray of FIG. 2 according to some embodiments herein:

DETAILED DESCRIPTION OF PREFERRED EMBODIMENTS

Figure 1:
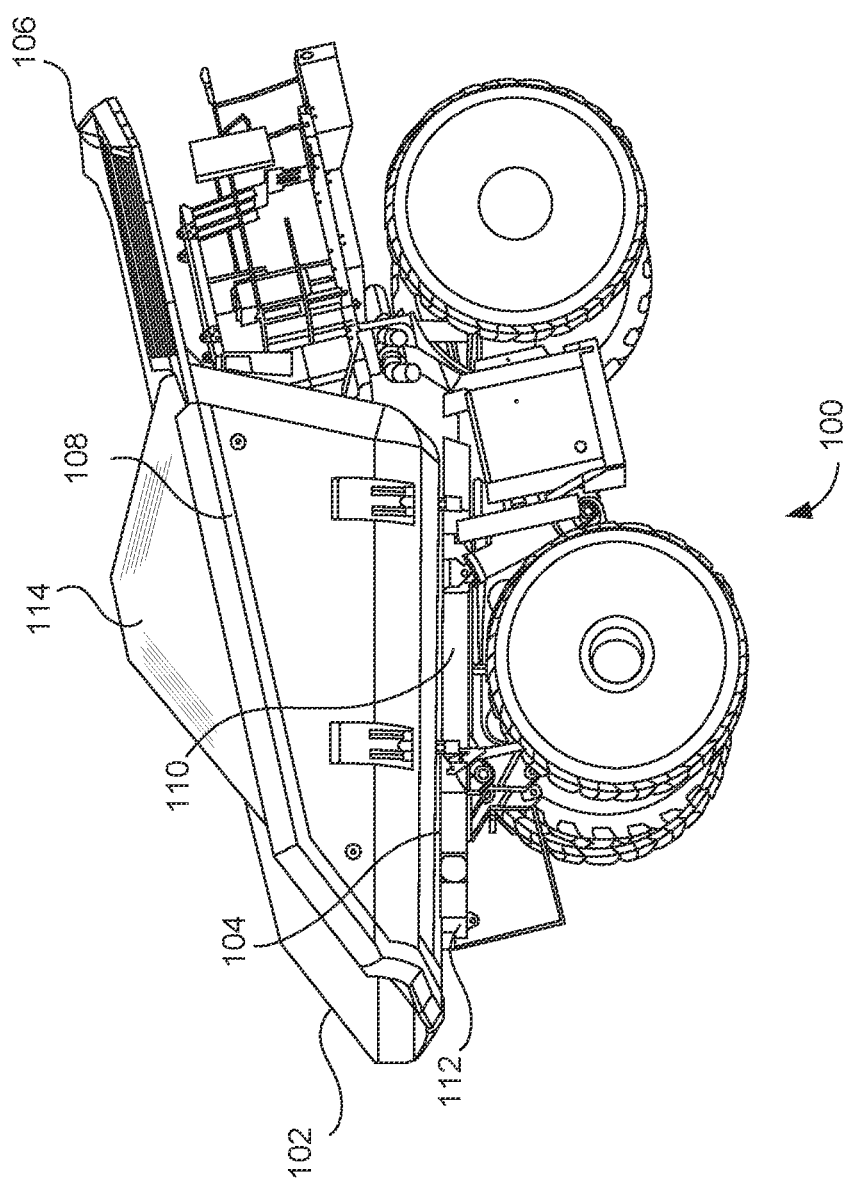
FIG. 1 illustrates an example view of a haul truck with a haul truck tray according to some embodiments herein.

The embodiments herein and the various feature values and advantageous details thereof are explained more fully with reference to the non-limiting embodiments that are illustrated in the accompanying drawings and detailed in the following description. The examples used herein are intended to facilitate an understanding of ways in which the claimed inventions may be practiced and to further enable those of skill in the art to practice the embodiments herein and the subject matter of the claims. Accordingly, the examples should not be construed as limiting the scope of the embodiments herein or the claims of this application.

The present application describes a technical solution to the technical problem of heavy haul truck tray liners, which are often made of steel plates. Certain of the technical solutions provided herein involve, inter alia, novel methods for applying a protective coating to a haul truck tray to form a wear liner without the need for heavy steel plates. Referring now to the drawings, and more particularly to FIGS. 1 through 9, where similar reference characters denote corresponding feature values consistently throughout the figures, there are shown preferred embodiments.

FIG. 1 illustrates an example view of a haul truck with a haul truck tray according to some embodiments herein. The haul truck 100 includes a haul truck tray 102, a pneumatic shock absorption system 104, a canopy 106, a load-carrying assembly 108, and a stabilization and tray supporting system 110. The load-carrying assembly 108 may include a two-piece carbon fiber laminate tray structure. In some embodiments, the load-carrying assembly 108 has a high and low-density foam core and includes a carbon fiber laminate surface. The pneumatic shock absorption system 104 may include one or more pneumatic cushioning elements, one or more gas reservoirs, and one or more connector assemblies. While loading the haul truck tray 102, large impact forces may strike a wear liner of the haul truck tray 102, placing extreme physical stresses on the haul truck tray 102, one or more support members 112, and/or the chassis of the haul truck. While loading the haul truck tray 102, the pneumatic shock absorption system 104 that is filled with gas may absorb and/or dissipate a portion of the energy of the large impact forces via compression of gas and a concomitant increase in pressure within the one or more pneumatic cushioning elements, and/or via release of gas into the one or more gas reservoirs. In some embodiments, the pneumatic shock absorption system 104 is designed to maintain a dynamic equilibrium in which the one or more pneumatic cushioning elements are kept at a substantially constant working pressure so that there is a capacity for additional gas compression and cushioning. Increased weight on the pneumatic shock absorption system 104, e.g., during loading of the haul truck tray 102 may supply a baseline net increasing force that increases the baseline pressure within the elongated compartment of the one or more pneumatic cushioning elements. This increased pressure may be regulated by the release of gas into the one or more gas reservoirs.

The stabilization and tray supporting system 110 may include one or more support members 112 as a tray support structure. The tray support structure may also include at least one location for accepting a pivot mechanism connection and at least one location for accepting a hoisting mechanism connection. In some embodiments, the tray support structure includes one or more outriggers that are configured to provide roll stabilization support via one or more connections between an outrigger located on a side wall of the tray and stabilization and tray supporting system 110. The canopy 106 may be attached to haul truck tray 102 to protect an operator cabin. In some embodiments, canopy 106 is designed to shield forward portions of haul truck 100 from debris during loading and transport. In some embodiments, load-carrying assembly 108 may include a bed connector that connects with the stabilization and tray support system 110 to provide stabilization while loading the haul truck tray 102.

Figure 2:
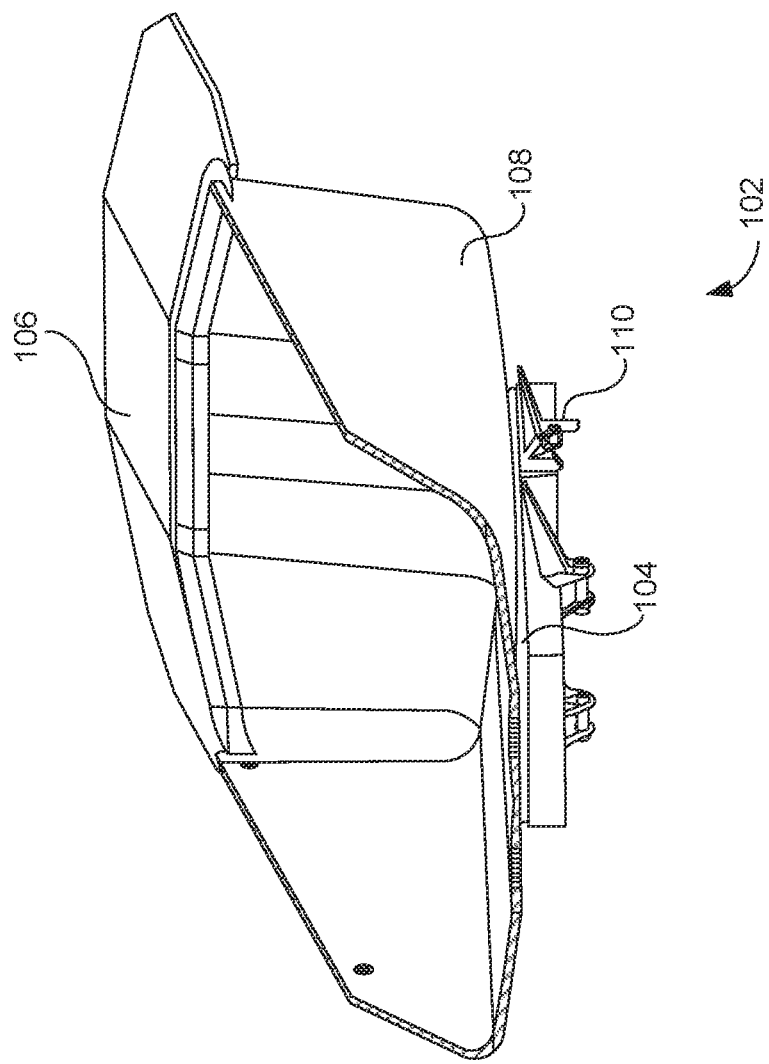
FIG. 2 illustrates a perspective view of a haul truck tray according to some embodiments herein.

FIG. 2 illustrates a perspective view of a haul truck tray according to some embodiments herein. The haul truck tray 102 may mechanically connect with the pneumatic shock absorption system 104, the canopy 106, the load-carrying assembly 108, and the stabilization and tray supporting system 110. The pneumatic shock absorption system 104 absorbs, mitigates, and/or dampens shock impulses and pressure from the haul truck tray 102 in general, for example during loading and transport. In some embodiments, the load-carrying assembly 108 includes a foam core and a carbon fiber laminate surface. The foam core may include a high- or low-density foam core. In some embodiments, the haul truck tray 102 comprises both carbon fiber and steel components. The load-carrying assembly 108 may include a two-piece carbon fiber laminate tray structure.

In some embodiments, the load carrying assembly 108 includes polyurethane joints for shear strength, tensile strength, energy dissipation, flexibility, and/or durability. In some embodiments, polyurethane joints include bonding of load carrying assembly 108 components, wherein the bonding provides at least one of shear strength, tensile strength, energy dissipation, durability, or flexibility. In some embodiments, the stabilization and tray supporting system 110 is connected with the haul truck tray 102 using one or more bed connector assemblies. The one or more bed connector assemblies may comprise known mechanisms for connecting a tray to a chassis, including any of chain links, pins, cams; or components of a pivot sub-assembly and/or hoist portion. In some embodiments, cams may permit rotation of the haul truck tray 102 relative to a pivot point on the chassis.

Stabilization and tray support system 110 may include one or more support members 112 as a tray support structure. The tray support structure may also include at least one location for accepting a pivot mechanism connection and at least one location for accepting a hoisting mechanism connection. In some embodiments, the tray support structure includes one or more connections to one or more outriggers on the tray, wherein the connection between an outrigger and the tray support structure is configured to provide roll stabilization support. The one or more support members 112 may include a pair of truck dump tray supports positioned between a portion of a chassis of a haul truck and the haul truck tray 102. The pair of haul truck dump tray supports may include two longitudinal support beams that are aligned with one or more wheels of the haul truck, and which extend over a length from the front to the rear of the haul truck tray 102. In some embodiments, the two longitudinal support beams extend from a front location to a rear location of the haul truck tray 102. The pair of haul truck dump tray supports may comprise at least one carbon fiber composite material. The pneumatic shock absorption system 104 may dissipate at least a portion of the weight from the tray support structure, tray, and or load that is above the pneumatic shock absorption system 104.

Figure 3:
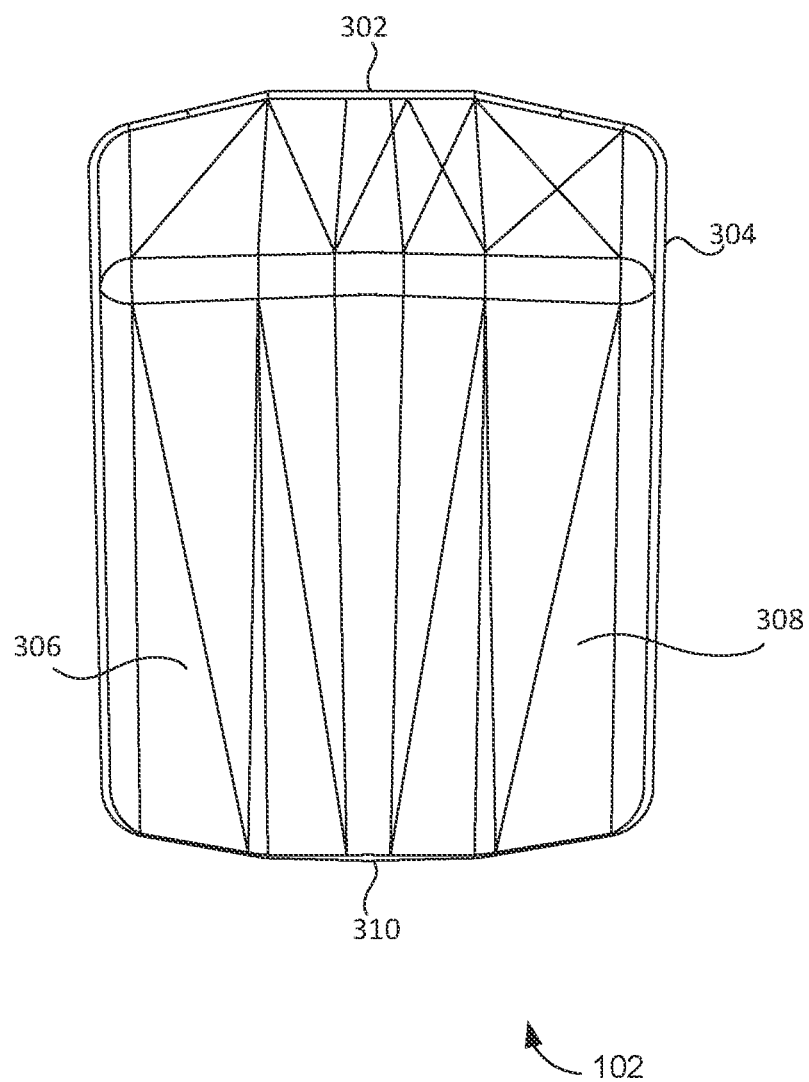
FIG. 3 illustrates an example exploded view of the haul truck tray of FIG. 2 according to some embodiments herein.

FIG. 3 illustrates an example exploded view of the haul truck tray of FIG. 2 according to some embodiments herein. The haul truck tray 102 may include the load-carrying assembly 108 that may mechanically connect with the canopy and a canopy joining member. The load-carrying assembly 108 may include a top edge portion 302, a polymer canopy portion 304, a first longitudinal body portion 306, a second longitudinal body portion 308, and a bottom edge portion 310. In some embodiments, the first longitudinal body portion 306 and the second longitudinal body portion 308 may include at least one of a first material or a second material. In some embodiments, the first material and the second material may include carbon fiber and steel components. The carbon fiber composite material may include, for example, polyacrylonitrile (PAN) material. In some embodiments, both carbon fiber and steel components are bonded using an adhesive material, for example, an elastomeric material.

In some embodiments, the elastomeric material includes at least one of polyurethane or a cast polyurethane. For example, in some embodiments, placement of two carbon fiber halves of a tray together with steel support members above and below the centerline as anchoring members results in gaps between the tray halves and the steel support members. Elastomeric material may be used to fill these gaps, providing bonding at this critical centerline joint. Elastomeric bonding provides surprising strength and flexibility in this functional role. For example, use of elastomeric bonding compounds such as polyurethane avoid certain brittle qualities of other adhesives such as epoxy.

The system may further include a wear coating system to cover a length and or width of the one or more materials, for example the lining of the haul tray may act as a protective layer against damage to the carbon fiber halves of the tray when experiencing the impact of tons of rock falling from a height of several meters. In some embodiments, the system may create the adhesive bonding using a first material and a second material with the fixed length, width or height. In some embodiments, the first material or the second material may comprise a same material or different material that is selected from the one or more materials. In some embodiments, carbon fiber halves of the haul tray may be bonded to each other and to steel support members along and through the centerline of the tray using polyurethane in the gaps between these components. In some embodiments, the coating system includes a wear liner comprising cast polyurethane.

Figure 4:
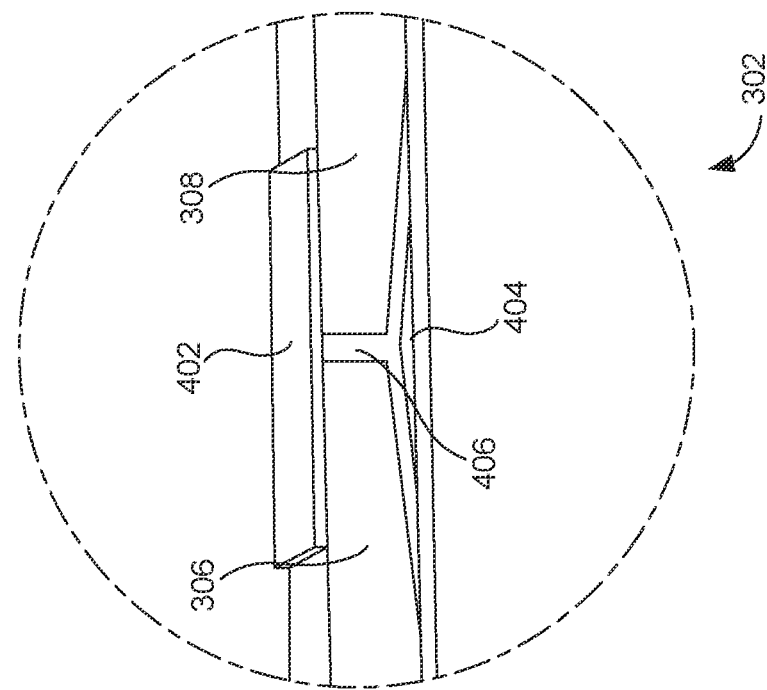
FIG. 4 illustrates an example cross-sectional view of at least one portion for adhesive bonding of the haul truck tray of FIG. 2 according to some embodiments herein.

FIG. 4 illustrates an example cross-sectional view of at least one portion for adhesive bonding of the haul truck tray of FIG. 2, according to some embodiments herein. The top edge portion 302 may include a topside support member 402, a bottomside support member 504, an interposing elastomeric link 406, a first longitudinal body portion 306, a second longitudinal body portion 308, and matching edges (not shown in figures). In some embodiments, the first longitudinal body portion 306 and the second longitudinal body portion 308 are mechanically connected using the interposing elastomeric link 406. The first material and the second material is placed to form a gap of a predetermined height and length. In some embodiments, the height of the gap is in the range of from 2 mm to 14 mm. In some embodiments, the elastomeric material has (i) a shear strength in the range of 1 MPa to 10 MPa and (ii) a tensile strength in the range of 0.1 MPa to 5 MPa. In some embodiments, the elastomeric material has a maximum shear strength of about 8 MPa. In some embodiments, the elastomeric material has a Young's Modulus in the range from 15 MPa to 55 MPa at elongation in the range of 100% to 300%. In some embodiments, the elastomeric material has an elongation break in the range of 10% to 400% at +10 degrees Celsius. In some embodiments, the one or more materials forming a bottom portion of the tray may have a bend geometry in a range of from +/−2° to 50° from a 180° degree plane representing a horizontal plane at the bottom of the tray. In some embodiments, the one or more materials are substantially coterminous as to their respective lengths, widths, and heights.

In some embodiments, a height associated with a gap is substantially equal to a distance between the first material and the second material. A length associated with the gap may be substantially orthogonal to the height and defined by a degree of overlap between the first and second materials. The gap may be filled with an elastomeric material to bond the first material and the second material. First longitudinal body portion 306 and second longitudinal body portion 308 may be mechanically connected using an interposing elastomeric link. In some embodiments, the interposing elastomeric link is a polyurethane bonding layer of at least 3 mm in thickness. In some embodiments, the interposing elastomeric link is cast polyurethane. In some embodiments, the interposing elastomeric link is formed by the curing of a urethane applied in fluid form. In some embodiments, the interposing elastomeric link 406 may be formed by filling gaps between tray components with the elastomeric material. For example, gaps between all surfaces of bottom support member 504, topside support member 402, first longitudinal body portion 306, and the second longitudinal body portion 308 may be filled with, e.g., fluid polyurethane, to provide an elastomeric link that bond each of these four components together along a centerline of the tray. The support members may be made of composite polymer material, steel, or other suitable material.

Figure 5:
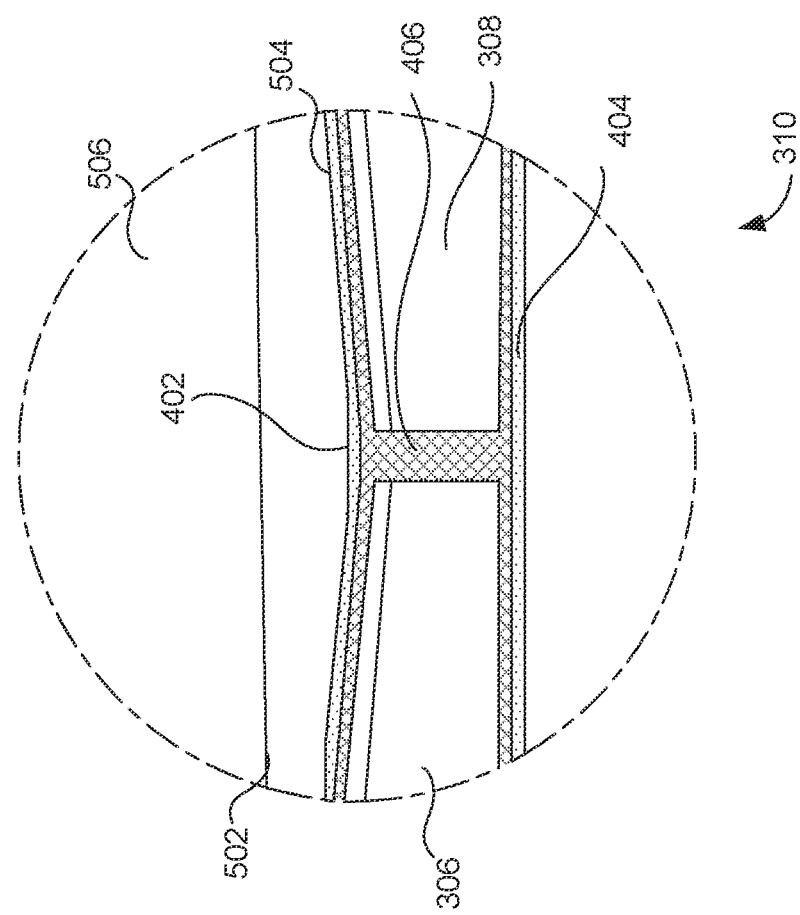
FIG. 5 illustrates an example cross-sectional view showing an adhesive bond of the haul truck tray of FIG. 2 according to some embodiments herein.

FIG. 5 illustrates an example cross-sectional view of a portion of the haul truck tray of FIG. 2 according to some embodiments herein. In some embodiments, the first longitudinal body portion 306 and the second longitudinal body portion 308 are mechanically connected using the interposing elastomeric link 406. The bottom edge portion 402 may include a wear liner 502, the elastomeric link 406, a tapered edge 504, the bottom support member 504, the first longitudinal body portion 306, the second longitudinal body portion 308 and surface coating 506. In some embodiments, the wear liner 502 includes an elastomeric material. In some embodiments, the elastomeric link 406 includes a polyurethane joint for providing shear strength, tensile strength, energy dissipation, durability, and flexibility. In some embodiments, the elastomeric link 406 may extend across the width of the first longitudinal body portion 306 and the second longitudinal body portion 308. The surface coating 506 may be applied as a fluid polyurethane that when cured provides resistance from abrasion and surface wear and tear.

Figure 6:
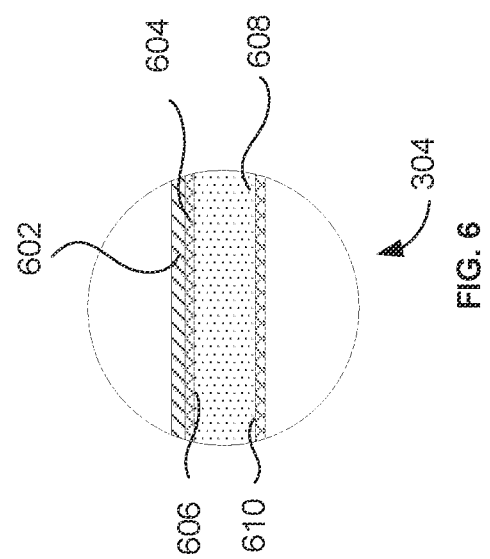
FIG. 6 illustrates an example cross-sectional view of a canopy showing an adhesive bond of the haul truck tray of FIG. 2 according to some embodiments herein.

FIG. 6 illustrates an example cross-sectional view of a canopy with adhesive bond of the haul truck tray of FIG. 2 according to some embodiments herein. The canopy may include at least one layer of polyurethane wear liner 602, a carbon fiber composite material 604, a first surface area 606, a low-density foam core 608, and a second surface area 610. In some embodiments, a top and a bottom layer of the canopy may be made up of carbon fiber composite material 604 that is at least one of aerospace or industrial grade. In some embodiments, the first surface area 606 and the second surface area 610 may accommodate elastomeric link 406.

FIG. 7 illustrates an example cross-sectional view of the haul truck tray of FIG. 2 according to some embodiments herein. Haul truck tray 102 may include a polyurethane wear liner 702, a carbon fiber laminate surface 704, and low-density foam core 608. In some embodiments, the haul truck tray may include a coating that covers at least a portion of a combination of at least two of a first material length, a first material width, a second material length and a second material width. In some embodiments, the coating may include a wear liner comprising a cast polyurethane.

Figure 8:
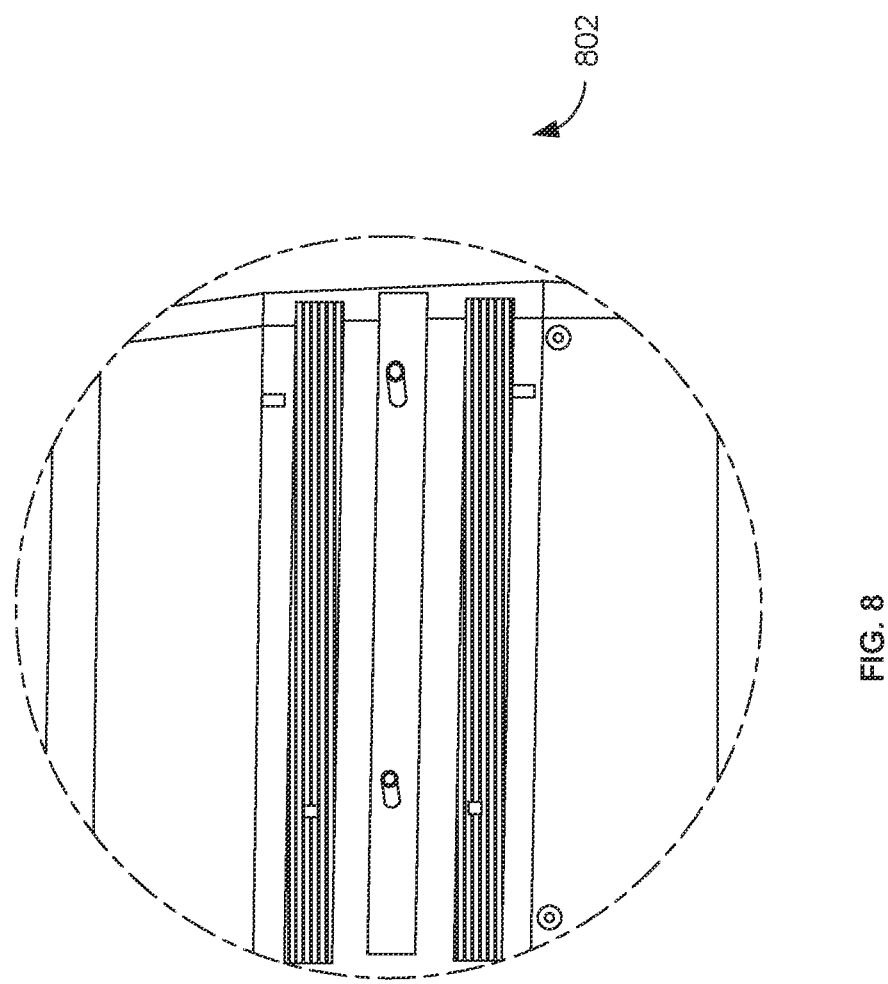
FIG. 8 illustrates an example bottom view of the haul truck tray of FIG. 2 according to some embodiments herein.

FIG. 8 illustrates an example bottom view of the haul truck tray of FIG. 2 according to some embodiments herein. The bottom view 802 of the haul truck tray 102 includes a high-density foam core construction. The high-density foam core construction may include polycarbonate, high density PVC, or foamed polycarbonate, which enhances the strength, rigidity, and durability of haul truck tray 102, thereby improving the structural integrity of haul truck tray 102.

Figure 9:
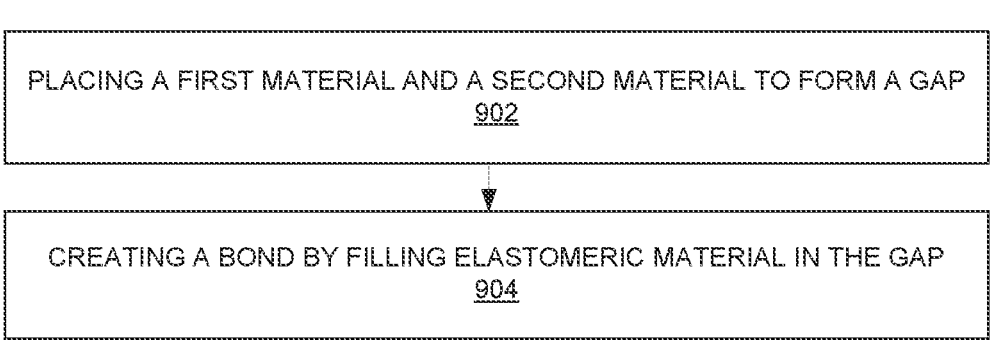
FIG. 9 illustrates a flow chart of a method of creating an adhesive bond using elastomeric material for making haul truck tray 102 according to some embodiments herein.

FIG. 9 illustrates a flow chart of a method of creating an adhesive bond using elastomeric material for haul truck tray 102 according to some embodiments herein. At step 902, a first and a second material are placed at a required height, length, and width for forming a gap. In some embodiments, the height of the gap is in the range of from 2 mm to 14 mm. At step 904, elastomeric material is poured into the gap to create a bond between the first material and the second material to form haul truck tray 102. In some embodiments, the elastomeric material has (i) a shear strength in the range of 1 MPa to 10 MPa and (ii) tensile strength in the range of 0.1 MPa to 5 MPa. In some embodiments, the elastomeric material has a Young's Modulus in the range of from 15 MPa to 55 MPa at elongation in the range of 100% to 300%.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the appended claims.

We claim:

1. A system for creating an adhesive bond using elastomeric material, the system comprising:
   a first material, the first material having a first material length and a first material width;
   a second material, the second material having a second material length and a second material width;
   a gap between the first material and the second material, wherein the gap includes a height and a length, the height being substantially equal to a distance between the first material and the second material, and the length being substantially orthogonal to the height and defined by a degree of overlap between the first and second materials; and
   an elastomeric material substantially filling at least a portion of the height and length of the gap between the first material and the second material, wherein the elastomeric material has a Young's Modulus equal to or less than 35 MPa at 300% elongation thereby providing enhanced energy absorption and impact resistance.

2. The system of claim 1 for creating an adhesive bond using elastomeric material, wherein the first material and the second material are substantially the same materials.

3. The system of claim 1 for creating an adhesive bond using elastomeric material, wherein the height of the gap is 1 mm or greater.

4. The system of claim 1 for creating an adhesive bond using elastomeric material, wherein the height of the gap is 2 mm or greater.

5. The system of claim 1 for creating an adhesive bond using elastomeric material, wherein the height of the gap is 3 mm or greater.

6. The system of claim 1 for creating an adhesive bond using elastomeric material, wherein the height of the gap is at least 3 mm and no greater than 12 mm.

7. The system of claim 1 for creating an adhesive bond using elastomeric material, wherein the elastomeric material has a maximum shear strength of about 8 MPa.

8. The system of claim 1 for creating an adhesive bond using elastomeric material, wherein the elastomeric material has a tensile strength greater than or equal to 0.2 MPa.

9. The system of claim 1 for creating an adhesive bond using elastomeric material, wherein the elastomeric material has an elongation break of not less than 300%.

10. The system of claim 2 or 9 for creating an adhesive bond using elastomeric material, wherein at least one of the first or second material comprises at least one of:
    a metal;
    a ceramic; and
    a polymer.

11. The system of claim 10 for creating an adhesive bond using elastomeric material, wherein the first material is a carbon fiber composite material.

12. The system of claim 10 for creating an adhesive bond using elastomeric material, wherein the first material is a steel material.

13. The system of claim 10 for creating an adhesive bond using elastomeric material, wherein the first material is an aluminum alloy material.

14. The system of claim 10 for creating an adhesive bond using elastomeric material, wherein the first material is a fiberglass material.

15. The system of claim 1 for creating an adhesive bond using elastomeric material, wherein the elastomeric material has an elongation break greater than 20%.

16. The system of claim 1 for creating an adhesive bond using elastomeric material, wherein the elastomeric material has an elongation break greater than 50% at +23 degrees Celsius.

17. The system of claim 1 for creating an adhesive bond using elastomeric material, wherein the elastomeric material comprises a polyurethane material.

18. The system of claim 17 for creating an adhesive bond using elastomeric material, wherein the elastomeric material comprises a cast polyurethane material.

19. The system of claim 1 for creating an adhesive bond using elastomeric material, wherein the first material further comprises a bend of +/−5° from 180°.

20. The system of claim 1 for creating an adhesive bond using elastomeric material, wherein the first material further comprises a bend of up to +/−30° from 180°.

21. The system of claim 1 for creating an adhesive bond using elastomeric material, wherein the first material and second material are substantially coterminous as to their respective lengths.

22. The system of claim 1 for creating an adhesive bond using elastomeric material, wherein the first material and second material are substantially coterminous as to their respective widths.

23. The system of claim 1 for creating an adhesive bond using elastomeric material, wherein the system further comprises a coating system, the coating system covering at least a portion of a combination of at least two of:
 the first material length;
 the first material width;
 the second material length; and
 the second material width.

24. The system of claim 23 for creating an adhesive bond using elastomeric material, wherein the coating system comprises a wear liner.

25. The system of claim 23 for creating an adhesive bond using elastomeric material, wherein the coating system comprises a cast polyurethane.

* * * * *